No. 842,689. PATENTED JAN. 29, 1907.
J. R. NORMAN.
WATER SPRAYER AND FIRE EXTINGUISHER.
APPLICATION FILED AUG. 1, 1905.

Witnesses
Inventor
J. R. Norman
By
Attorneys

UNITED STATES PATENT OFFICE.

JOHN R. NORMAN, OF POWELL STATION, TENNESSEE, ASSIGNOR OF ONE-HALF TO WILLIAM ROARK, OF BYINGTON, TENNESSEE.

WATER-SPRAYER AND FIRE-EXTINGUISHER.

No. 842,689.  Specification of Letters Patent.  Patented Jan. 29, 1907.

Application filed August 1, 1905. Serial No. 272,250.

*To all whom it may concern:*

Be it known that I, JOHN R. NORMAN, a citizen of the United States, residing at Powell Station, in the county of Knox and State of Tennessee, have invented certain new and useful Improvements in Water-Sprayers and Fire-Extinguishers, of which the following is a specification.

This invention relates to an improved apparatus for the distribution of water, and more particularly to a combined fire-extinguisher and water-sprayer.

For a full description of the invention and the merits thereof and also to acquire a knowledge of the details of construction of the means for effecting the result reference is to be had to the following description and accompanying drawings, in which—

Figure 1:
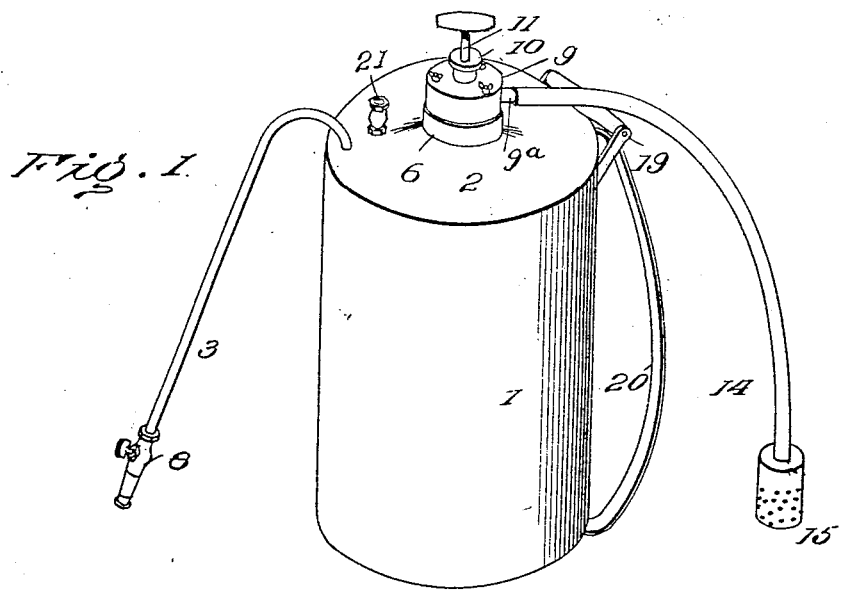
Figure 2:
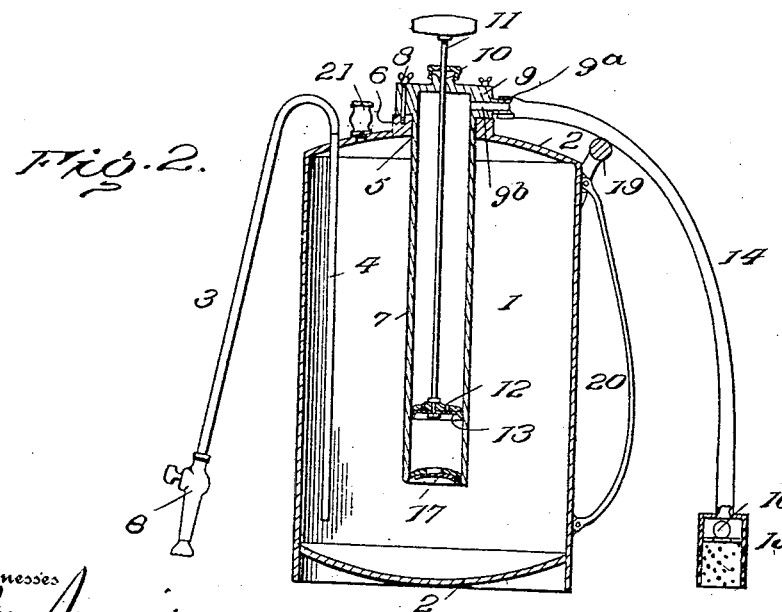

Figure 1 is a perspective view of the invention. Fig. 2 is a vertical longitudinal sectional view through same.

Corresponding and like parts are referred to in the following description and indicated in all the views of the drawings by the same reference characters.

The numeral 1 designates the tank, which is preferably made cylindrical in form and provided with bulged ends 2, so as to resist with greater facility any pressure which may exist within the tank. The discharge-hose 3 is connected to a pipe 4, which extends into the tank from the top thereof, so as to draw the water from the bottom. The top of the tank is provided with a central opening 5, which is surrounded by a reinforcing-collar 6. The barrel 7 of the pump passes through the opening 5 and is secured in position by means of bolts 8, extending upward from the collar 6 and passing through openings in an annular flange 9, which projects outwardly from the barrel 7 of the pump. The annular flange 9 rests upon the reinforcing-collar 6, and thereby suspends the pump-barrel 7 within the tank 1. The upper end of the barrel 7 is provided with a packing-nut 10, through which a rod 11 is passed. The lower end of the rod 11 is provided with a piston which comprises a perforated disk 12 and a leather washer 13, fitting loosely against the lower side of the disk 12 and having its edges turned downward in the usual manner against the sides of the barrel 7. A suction-hose 14 is connected at one end to nipple 9ª, projecting outwardly from the periphery of the annular flange 9 and in communication with a lateral passage 9ᵇ, extending through the vertical wall of the said flange. The free end of this suction-hose 14 is provided with a strainer 15 and a check-valve, which may be in the form of a ball 16, to prevent the backward flow of water through the hose 14. A valve 17 is located at the lower end of the barrel 7 and tends to prevent any backward flow of water from the tank into the pump.

Upon the downward stroke of the piston the leather washer 13 is forced against the disk 12, so as to close the perforatons therein, and a partial vacuum is created in the upper portion of the barrel 7, which sucks the water through the hose 14. When the piston is forced upwardly, the valve 16 prevents the water from flowing backward through the hose 14, and the water within the barrel 7 passes through the perforations in the disk 12 to the lower side of the piston, so that upon the downward stroke it will be forced through the valve 17 into the tank 1. As the water enters the tank the air therein is compressed, and since the opening in the pipe 4 is below the surface of the water the compressed air will force the water therethrough when the nozzle 8 on the discharge-pipe 3 is opened. Owing to the elasticity of the air, the water which enters the tank at intervals on each downward stroke of the piston will be forced through the discharge-pipe in a continuous stream. The device is preferably supplied with two nozzles, one for spraying and the other for throwing a solid stream of water when used as a fire-extinguisher, and either one of these nozzles can be used, as required. The strainer 15 at the end of the suction-hose 14 will be found of great value where the spraying-nozzle is used, since it prevents solid particles from entering the tank, which would interfere with the free flow of the water.

A handle 19 is secured to the upper portion of the tank so that it can be readily transported from place to place, and a shoulder-strap 20 is also employed, one end of which is attached to the handle 19, while the opposite end is secured to the lower side of the tank. In order that the pressure within the tank may never become so great as to render the apparatus dangerous, a safety-valve 21 of any suitable construction is employed.

It will be noted that the handle 19 is disposed transversely of the tank, at one end thereof, and that the shoulder-strap 20 is arranged longitudinally of the tank, the above arrangement of parts being advantageous in that under certain conditions of service when it is required to transport the tank or apparatus from one place to another at short distances apart the handle 19 may be grasped with one hand and the shoulder-strap 20 with the other hand, rendering it quite easy to carry the device such distances in a manner which will be evident. The above is particularly true when it is noted that it requires more or less exertion to throw the shoulder-strap over the shoulder and lift the apparatus thereby when it is desired to merely carry the tank a short distance.

Having thus described the invention, what is claimed as new is—

An apparatus of the character described, comprising a tank provided in its top with an opening and reinforcing-collar 6 projecting upwardly around said opening, a pump embodying a barrel fitting in said opening and having at its upper end an outwardly-extending flange adapted to rest upon said collar whereby to support the barrel within the tank, and a valved piston-rod working in said barrel and projecting from the upper end thereof, the said flange being provided in its vertical wall with a laterally-extending passage $9^b$ and having a nipple $9^a$ projecting from its periphery in communication with said passage, a suction-tube connected at one end to said nipple, bolts projecting upwardly from said reinforcing-collar and extending through said annular flange whereby to secure the flange to the collar, and a discharge-pipe connected to said tank and provided with a delivery-nozzle.

In testimony whereof I affix my signature in presence of two witnesses.

JOHN R. NORMAN. [L. S.]

Witnesses:
C. C. COWARD,
W. M. ROARK.